(12) United States Patent
Cook et al.

(10) Patent No.: US 7,725,579 B2
(45) Date of Patent: *May 25, 2010

(54) COMPUTER READABLE MEDIUM AND SYSTEM FOR REMOTE ACTIVITY MONITORING

(75) Inventors: Steven D. Cook, Tigard, OR (US); John T. Flynn, Morgan Hill, CA (US); Brian You, Mercer Island, WA (US); Vikas Ahluwalia, Kirkland, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/272,685

(22) Filed: Nov. 17, 2008

(65) Prior Publication Data
US 2009/0077232 A1 Mar. 19, 2009

Related U.S. Application Data

(63) Continuation of application No. 10/685,878, filed on Oct. 14, 2003, now Pat. No. 7,475,134.

(51) Int. Cl.
*G06F 15/173* (2006.01)
(52) U.S. Cl. .......................... 709/224; 714/5
(58) Field of Classification Search ................ 709/224, 709/212, 226; 714/4, 5; 707/8
See application file for complete search history.

(56) References Cited

U.S. PATENT DOCUMENTS

| 5,657,440 | A | 8/1997 | Micka et al. |
| 5,734,818 | A | 3/1998 | Kern et al. |
| 5,920,695 | A | 7/1999 | Hathorn et al. |
| 6,304,980 | B1 | 10/2001 | Beardsley et al. |
| 6,421,787 | B1 * | 7/2002 | Slaughter et al. ............... 714/4 |
| 6,438,705 | B1 * | 8/2002 | Chao et al. ..................... 714/4 |
| 6,446,176 | B1 | 9/2002 | West et al. |
| 6,484,187 | B1 | 11/2002 | Kern et al. |
| 6,499,112 | B1 | 12/2002 | Milillo et al. |
| 6,785,678 | B2 * | 8/2004 | Price ............................. 707/8 |

(Continued)

FOREIGN PATENT DOCUMENTS

JP 2001-034568 2/2001

OTHER PUBLICATIONS

IBM Corp., "Management of Peer-to-Peer Control Unit Paths", IBM Technical Disclosure Bulletin, Sep. 1995, vol. 38, No. 9, pp. 95-98.

(Continued)

*Primary Examiner*—Jungwon Chang
(74) *Attorney, Agent, or Firm*—David W. Victor; Konrad Raynes & Victor LLP

(57) ABSTRACT

A computer readable medium and system for remotely monitoring activity includes generating first server heartbeat information at a first server at a local site, and storing the first server heartbeat information in a first primary site disk at the local site. The method also includes sending the first server heartbeat information from the first primary site disk, to a first secondary site disk at a remote site. The method further includes receiving information from a 10 second secondary site disk at the local site, and determining if the information received from the second secondary site disk includes updated heartbeat information.

20 Claims, 5 Drawing Sheets

U.S. PATENT DOCUMENTS

| | | |
|---|---|---|
| 6,848,021 B2 | 1/2005 | Segev et al. |
| 7,076,620 B2 | 7/2006 | Takeda et al. |
| 7,076,687 B2 | 7/2006 | Fujibayashi et al. |
| 7,152,078 B2 | 12/2006 | Yamagami |
| 7,203,748 B2 * | 4/2007 | Hare et al. ............... 709/224 |
| 7,275,100 B2 | 9/2007 | Yamagami |
| 7,424,519 B2 * | 9/2008 | Hoshino et al. ............. 709/212 |
| 7,475,134 B2 * | 1/2009 | Cook et al. ................. 709/224 |
| 2002/0049845 A1 * | 4/2002 | Sreenivasan et al. ........ 709/226 |
| 2003/0158936 A1 * | 8/2003 | Knop et al. ................. 709/224 |
| 2005/0033828 A1 | 2/2005 | Watanabe |

OTHER PUBLICATIONS

IBM Corp., "Remote Copy Link-Level Reconfiguration without Affecting Copy Pairs", IBM Technical Disclosure Bulletin, Jan. 1995, vol. 38, No. 1, pp. 305-306.

IBM Corp., "Bad Response to Establish Pathing Control Frame in Peer-to-Peer Remote Copy Function", IBM Technical Disclosure Bulletin, Dec. 1995, vol. 38, No. 12, pp. 515-517.

* cited by examiner

COMPUTER READABLE MEDIUM AND SYSTEM FOR REMOTE ACTIVITY MONITORING

CROSS-REFERENCE TO RELATED APPLICATIONS

This application is a continuation of U.S. patent application Ser. No. 10/685,878, filed on Oct. 14, 2003, which issued as U.S. Pat. No. 7,475,134, and which patent is incorporated herein by reference in its entirety.

BACKGROUND

1. Technical Field

The present invention relates to remotely monitoring server activity. More particularly, the invention concerns enabling servers at a site to determine if servers at a remote peer site are operational, even when private and public communication links between the sites are not functioning.

2. Description of Related Art

In high performance computing systems, two or more servers (also called nodes) are often connected to form a cluster. During normal operation, at any given time only one server in a cluster can be in control of the cluster, and the server that is in control of the cluster is referred to as "owning" the cluster at that time. Whichever server gains control of a common resource (for example, a quorum disk) owns the cluster. An undesirable erroneous condition called "split brain" results if two or more servers operate as if they have read or write access to the same data at the same time and believe they each are in control of the cluster at the same time. The split brain condition can result if a first server erroneously concludes that a second server is not operational, when the second server is operational. However, the split brain condition can be avoided by providing communications between the servers in a cluster. For example, server clustering software may use TCP/IP based communications for transmitting communications, referred to as "heartbeat communications", between nodes in a cluster for determining if all of the nodes are operational. The heartbeat communications may be transmitted over a private communications link, which may be a private Ethernet link, between the servers in a cluster. The servers in a cluster may also be connected via a public communications link, which may be an Ethernet link, which is used to connect one or more client computers that may be running application programs, to the servers. The public Ethernet link may be used as a backup communications link for transmitting heartbeat communications between the servers in a cluster. If heartbeat communications are disrupted due to malfunctions of both the private and public Ethernet links, a common disk resource may be used to determine which node owns cluster operations in systems in which the servers are not separated by significant distances. For example, clustering solutions such as Microsoft Cluster Server can use a common disk resource, called a quorum disk, to determine which node owns cluster operations. However, if the servers are separated by significant distances, for example several or tens or hundreds of kilometers, there is no common disk resource, and there is no way to determine which node owns cluster operations if both the private and public Ethernet links fail.

As an example, there is no common disk resource when data is mirrored from a primary site to a remote secondary site. Many computer users, for example businesses and governments, update and store data at a primary site, and maintain a backup copy of the data at a secondary site that is physically remote from the primary site, which can be used for recovery from a disaster at the primary site. Making a backup copy of data at a remote secondary site is referred to as data mirroring, data shadowing, data duplexing, or remote copying. The servers at the primary site may be separated from the servers at the secondary site by significant distances, for example hundreds of kilometers. The International Business Machines (IBM) Peer-to-Peer Remote Copy (PPRC) facility is an example of a widely used synchronous remote data mirroring system.

The significant distance between remote data mirroring sites makes it unlikely that a secondary site will be harmed if there is an equipment failure or other disaster that damages or destroys data at the primary site, thereby permitting data to be recovered from the secondary site in the event of an equipment failure or disaster at the primary site. However, the distance between the primary and secondary sites precludes using a common disk resource for determining which node owns cluster operations, if both the private and public Ethernet links fail. Consequently, if the servers in a cluster are separated by significant distances, such as in a remote data mirroring system, and if both the private and public Ethernet links between the servers are not functioning, undesirable split brain operation can result because there is no way for servers at one site to determine if servers at another site are operational.

SUMMARY

One aspect of the invention is a method for remotely monitoring activity. An example of the method includes the operations of generating first server heartbeat information at a first server at a local site, and storing the first server heartbeat information in a first primary site disk at the local site. The method also includes sending the first server heartbeat information from the first primary site disk, to a first secondary site disk at a remote site. The method further includes receiving information from a second secondary site disk at the local site, and determining if the information received from the second secondary site disk includes updated heartbeat information.

Other aspects of the invention are described in the sections below, and include, for example, a computing system, and a signal bearing medium tangibly embodying a program of machine-readable instructions executable by a digital processing apparatus to perform a method for remotely monitoring activity.

The invention provides a number of advantages. For example, the invention advantageously permits servers at a local site that is separated by a significant distance from servers at a remote site, to determine if servers at the remote site are operational, even when both private and public Ethernet links between the local and remote sites are not functioning. Similarly, some examples of the invention also permit servers at the remote site to determine if servers at the local site are operational. Consequently, undesirable split brain operation can be avoided. The invention also provides a number of other advantages and benefits, which should be apparent from the following description.

DETAILED DESCRIPTION

Figure 1:
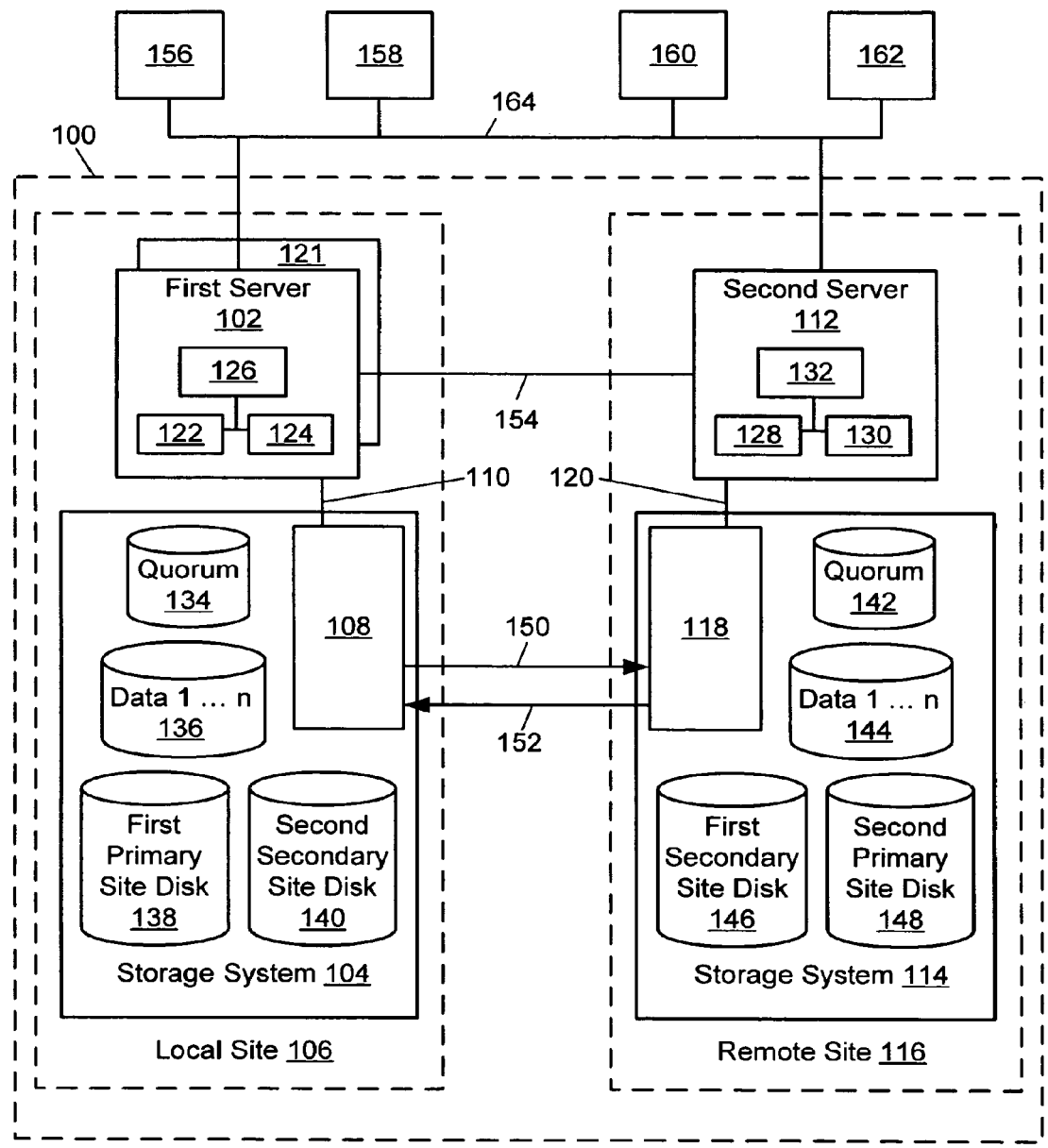
FIG. 1 is a block diagram of the hardware components and interconnections of a geographically dispersed cluster in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a computing system wherein server activity can be remotely monitored. As an example, the computing system may be embodied by the hardware components and interconnections of geographically dispersed cluster 100 shown in FIG. 1. The cluster 100 may be used, for example, for processing and storing data for banks, governments, large retailers, or medical care providers.

The cluster 100 includes a first server 102 (which may also be called a node), and a first storage system 104, which are located at a local site 106. The first server 102 is coupled to a first storage controller 108 in the first storage system 104 with link 110, which may be, for example, FCP (Fibre Channel Protocol) or parallel SCSI links. Similarly, the cluster 100 includes a second server 112, and a second storage system 114, which are located at a remote site 116. The second server 112 is coupled to a second storage controller 118 in the second storage system 114 with link 120, which may be, for example, FCP or parallel SCSI links. The words "local" and "remote" are used to distinguish between two sites. However, the designation of one of the sites as "local" and the designation of the other site as "remote" is arbitrary. In other words, the "local" site could be referred to as the "remote" site, and the "remote" site could be referred to as the "local" site. Additionally, the second server 112 may be called the peer server (or node) of the first server 102, and similarly, the first server 102 may be called the peer server of the second server 112. As an example, the local site and the remote site may be separated by distances up to 103 kilometers or more. The cluster 100 may be implemented, for example, utilizing Microsoft Cluster Service (MSCS), which is produced by Microsoft Corporation, and the PPRC function of Enterprise Storage Servers (ESS), which are manufactured by International Business Machines Corporation.

In some examples of the cluster 100, the local site 106 could have more than one server, and similarly, the remote site 116 could have more than one server. Generally, any number of servers could be included at each site 106, 116, and in one example, four servers could be included at each site 106, 116. In the example shown in FIG. 1, a third server 121, which would be coupled to other elements in the cluster 100 similarly to the first server 102, is shown at the local site 106.

The first server 102 includes a first memory 122, a first non-volatile storage 124, and a first processor 126. Similarly, the second server 112 includes a second memory 128, a second non-volatile storage 130, and a second processor 132. As an example, each of the processors 126, 132 may be an Intel processor. In some examples, each server 102, 112 could have more than one processor. The memories 122, 128 may be called fast access storage, and may be RAM. As an example, the memories 122, 128 may be used to store data and application programs and/or other programming instructions executed by the processors 126, 132. The non-volatile storage 124, 130 could be, for example, hard disk drives, or drives for reading and writing from optical or magneto-optical media, tape drives, or any other suitable type of storage. In some examples the memories 122, 128 or the non-volatile storages 124, 130 could be eliminated, or the memories 122, 128 and non-volatile storages 124, 130 could be provided on the processors 126, 132, or alternatively, external from the servers 102, 112.

Each server 102, 112 may be, for example, an IBM xSeries server. Alternatively each server 102, 112 could be an IBM zSeries Parallel Sysplex server, such as a zSeries 900, running the z Operating System (z/OS). In another example, each server 102, 112 could be an IBM S/390 server running OS/390. Alternatively, each server 102, 112 could be implemented with a mainframe computer, a computer workstation, a personal computer, a supercomputer, or other suitable computing device. It is not necessary for each server 102, 112 to be implemented with the same type of computing device.

The first storage system 104 includes a first quorum disk 134, one or more first data disks 136, a first primary site disk 138, and a second secondary site disk 140, which are coupled to the first storage controller 108. Similarly, the second storage system 114 includes a second quorum disk 142, one or more second data disks 144, a first secondary site disk 146, and a second primary site disk 148, which are coupled to the second storage controller 118. Each disk 134, 136, 138, 140, 142, 144, 146, 148 could also be implemented as a volume. In one example, the first storage system 104 and the second storage system 114 are each a model 2105 Enterprise Storage Server, manufactured by International Business Machines Corporation. The first storage controller 108 may be coupled to the second storage controller 118 with a first ESCON link 150, and a second ESCON link 152, (which may be unidirectional, and which may also be called communications links or PPRC communications links). Appropriate communications technology other than ESCON could also be used for these links. When referring to the quorum disks 134, 142, data disks 136, 144, and site disks 138, 140, 146, 148, the word "disk" is intended to broadly cover any suitable type of storage device, using any suitable technology, such as magnetic, optical, magneto-optical, or electrical, and includes hard disk drives, optical disks or discs (for example, CD-RW, DVD-RW, or DVD+RW), floppy disks, magnetic data storage disks or diskettes, magnetic tape, digital optical tape, EPROMs, EEPROMs, RAM, Non-Volatile RAM, and flash memory.

The first server 102 is coupled to the second server 112 with a private communications link 154, which may be a private Ethernet link. Client computers 156, 158, 160, 162 are coupled to the first server 102 and the second server 112 via a public communications link 164, which provides another or alternate communications path between the first server 102 and the second server 112, and which may be a public Ethernet network. As an example, each client computer 156, 158, 160, 162 may be a personal computer, and may run any suitable operating system, for example Windows, Linux, Unix, or an Apple operating system. In some implementations the public communications link 164, or the client computers 156, 158, 160, 162 and the public communications link 164, may be considered to be part of the cluster 100 rather than external to the cluster 100.

II. Operation

In addition to the hardware embodiments described above, another aspect of the invention concerns a method for remotely monitoring activity.

A. Signal-Bearing Media

In the context of FIG. 1, the method aspect of the invention may be implemented, for example, by having one or more of the servers 102, 112 execute a sequence of machine-readable instructions, which can also be referred to as code. These instructions may reside in various types of signal-bearing media. In this respect, one aspect of the present invention concerns a programmed product, comprising a signal-bearing medium or signal-bearing media tangibly embodying a program of machine-readable instructions executable by a digital processing apparatus to perform a method for remotely monitoring activity.

Figure 2:
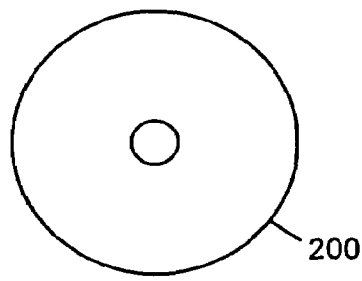
FIG. 2 is an example of a signal-bearing medium in accordance an example of the invention.

This signal-bearing medium may comprise, for example, first memory 122, first non-volatile storage 124, second memory 128, second non-volatile storage 130, first data disks 136, and/or second data disks 144. Alternatively, the instructions may be embodied in a signal-bearing medium such as the optical data storage disc 200 shown in FIG. 2. The optical disc can be any type of signal bearing disc or disk, for example, a CD-ROM, CD-R, CD-RW, WORM, DVD-R, DVD+R, DVD-RW, or DVD+RW. Additionally, whether contained in the cluster 100 or elsewhere, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

B. Overall Sequence of Operation

Figure 3:
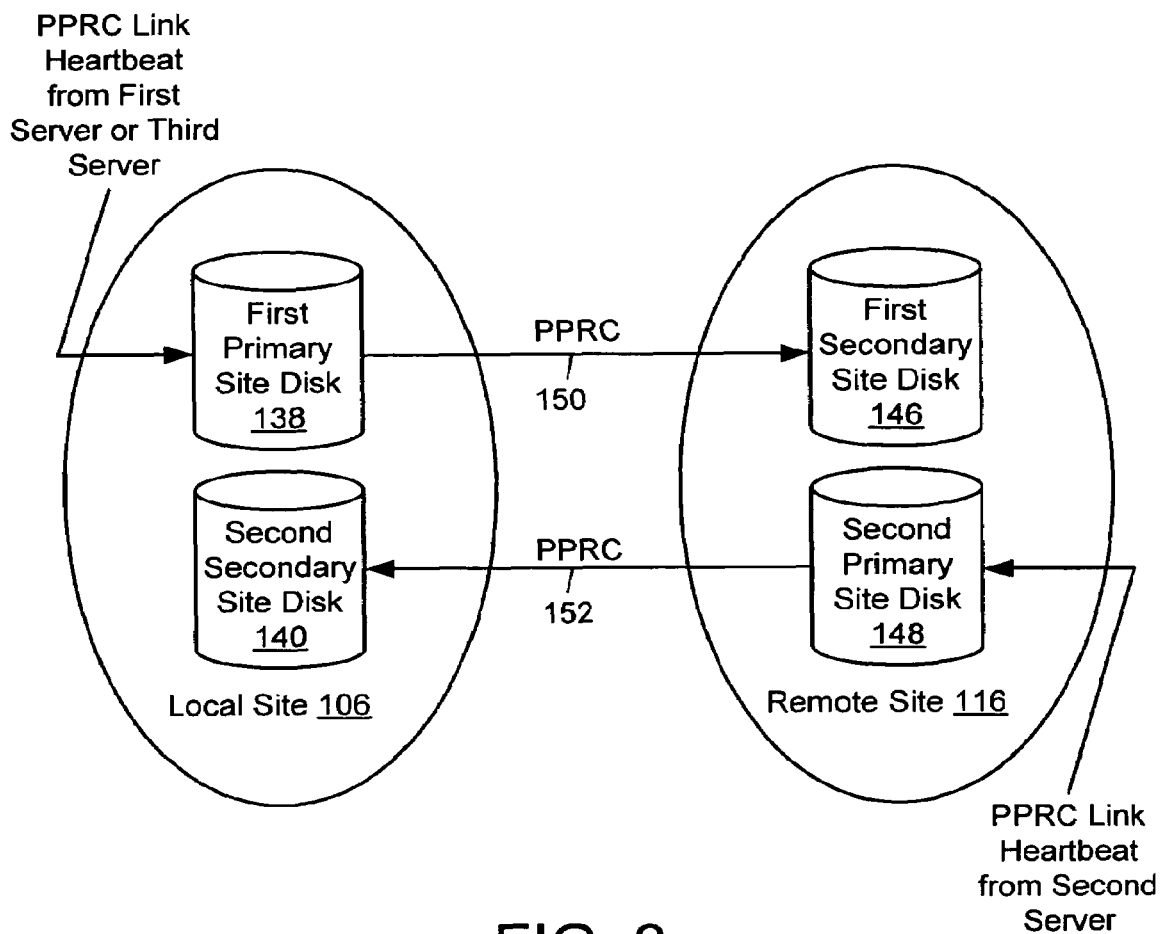
FIG. 3 is a block diagram showing geographically dispersed site disks in accordance with an example of the invention.

For ease of explanation, but without any intended limitation, the method aspect of the invention is described with reference to the cluster 100 described above and shown in FIG. 1. Additionally, FIG. 3, which is a block diagram showing geographically dispersed site disks in accordance with an example of the invention, may also facilitate understanding the method aspect of the invention. FIG. 3 illustrates that a PPRC link heartbeat from the first server 102 is stored on the first primary site disk 138 at the local site 106, and is transmitted across the PPRC communications link 150 to the first secondary site disk 146 at the remote site 116. Similarly, FIG. 3 illustrates that a PPRC link heartbeat from the second server 112 is stored on the second primary site disk 148 at the remote site 116, and is transmitted across the PPRC communications link 152 to the second secondary site disk 140 at the local site 106.

Figure 4A:
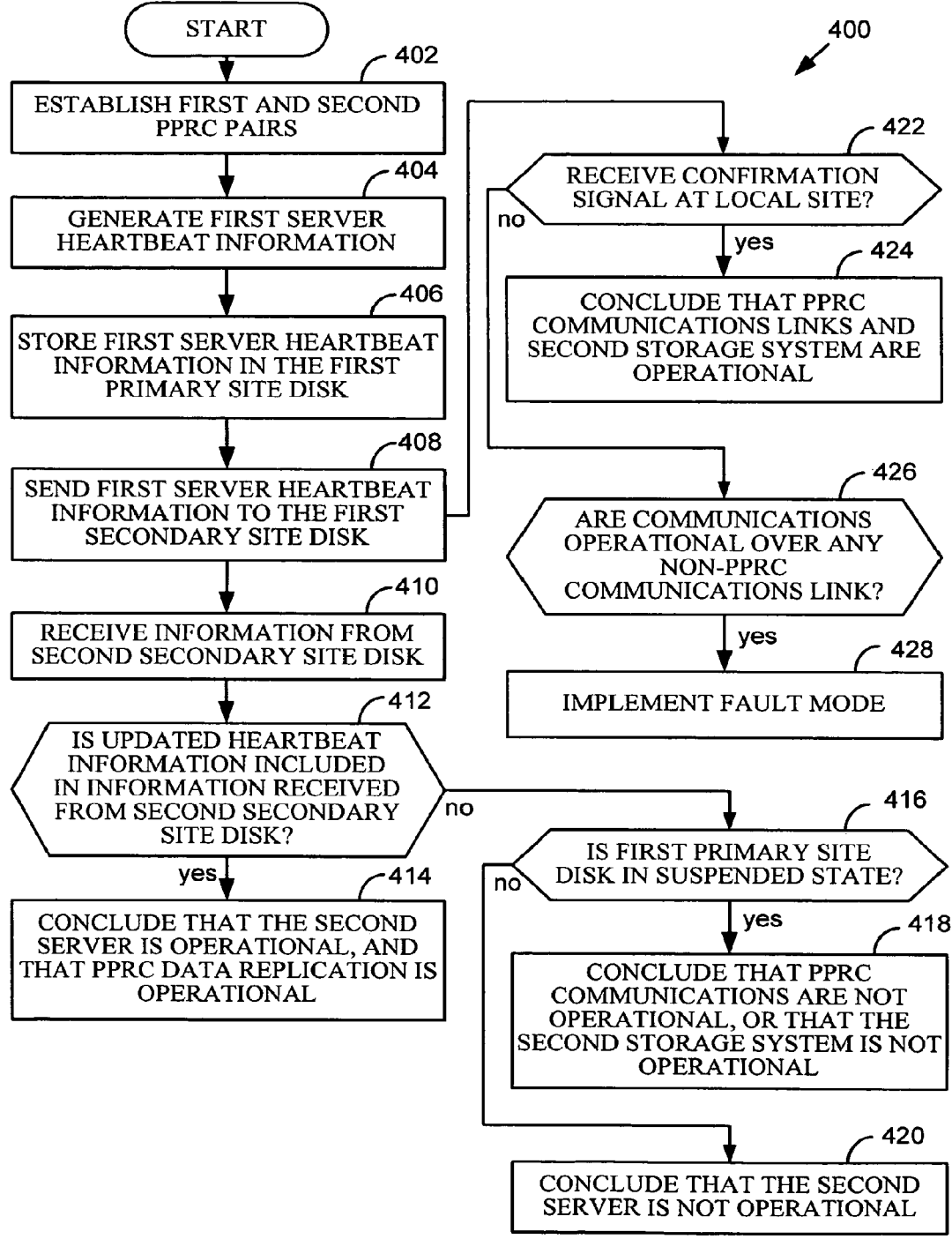
FIGS. 4A, 4B, and 4C are a flowchart of an operational sequence for remotely monitoring activity in accordance with an example of the invention.
Figure 4B:
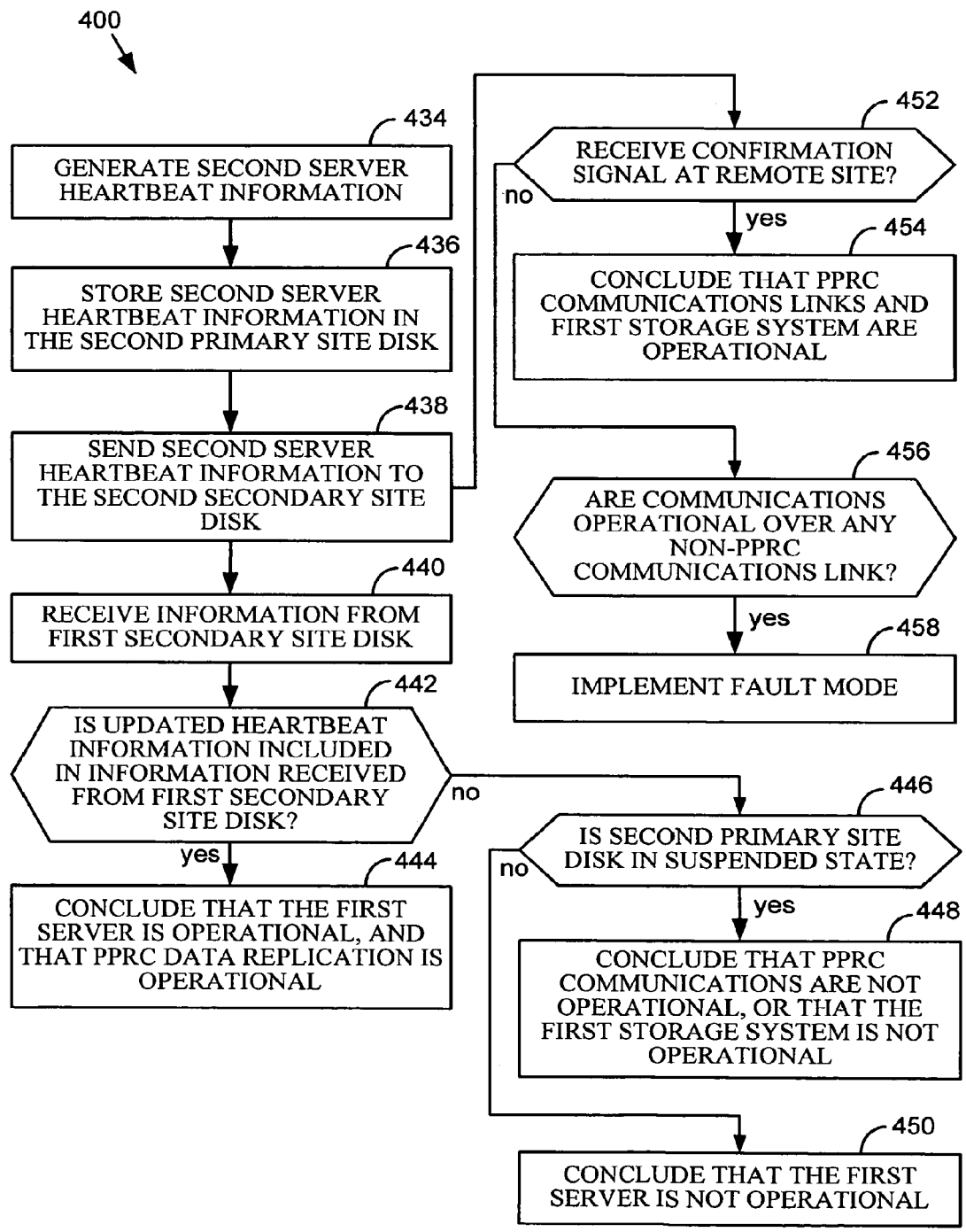
Figure 4C:
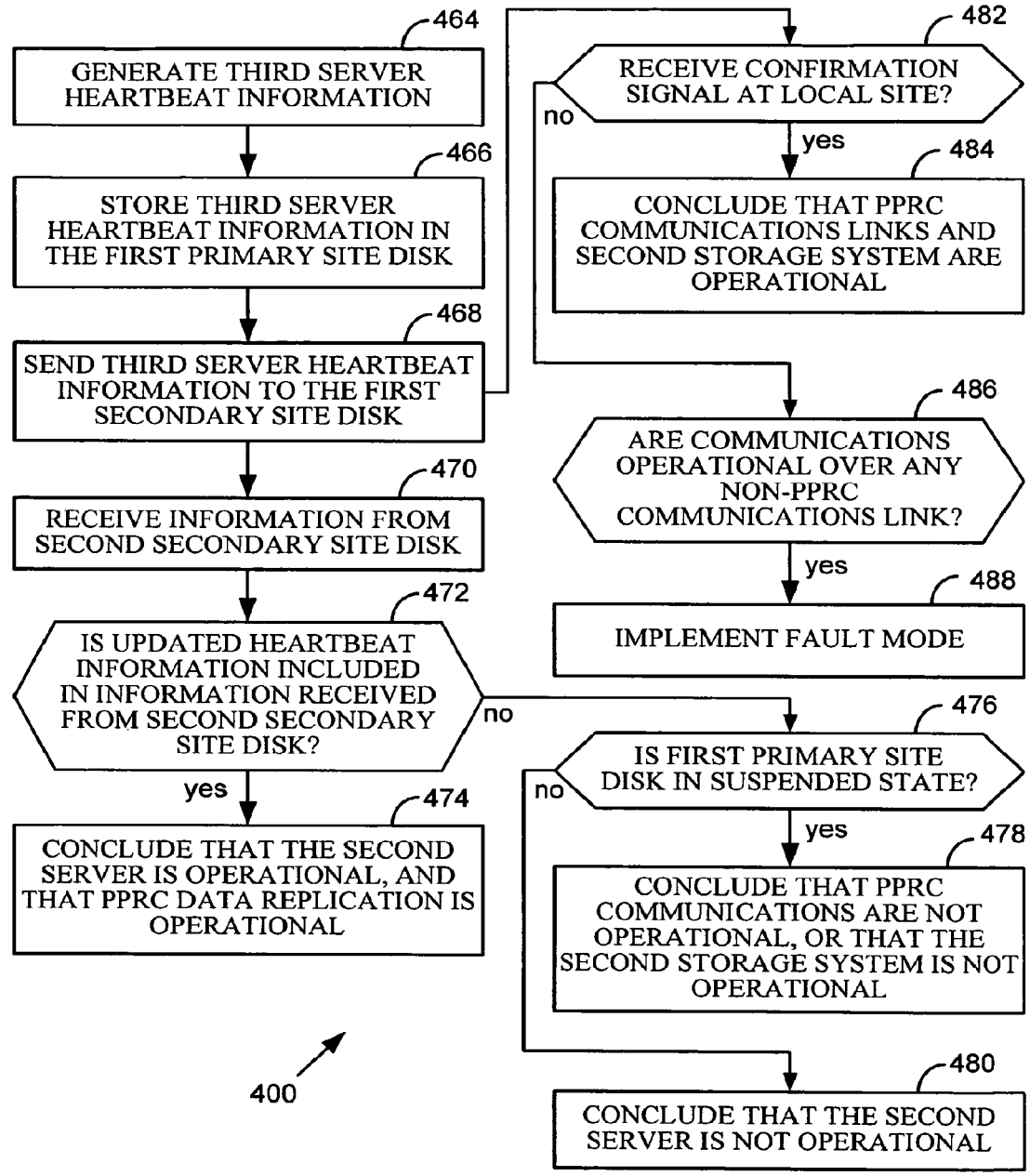

An example of the method aspect of the present invention is illustrated in FIGS. 4A, 4B, and 4C, which show a sequence 400 for a method for remotely monitoring activity. Referring to FIG. 4A, the sequence 400 may include, and begin with, operation 402 which comprises establishing first and second PPRC pairs using a Read From Secondary option, wherein the first PPRC pair comprises the first primary site disk 138 and the first secondary site disk 146, and the second PPRC pair comprises the second primary site disk 148 and the second secondary site disk 140. In some examples of the invention, operation 400 comprises establishing only the first PPRC pair or the second PPRC pair. PPRC uses unidirectional private communication links 150, 152 that may be implemented using ESCON technology. Other examples of the invention may be implemented with bidirectional communications link(s) rather than unidirectional communication links. Using two of these links 150, 152, one in each direction, the PPRC pairs can be created, with the primary of the first pair at a first site and the secondary of the first pair at a second site, and with the primary of the second pair at the second site and the secondary of the second pair at the first site. Establishing a PPRC pair may comprise making an initial copy of the information on the primary site disk, onto the secondary site disk, and then entering a duplexed state wherein there is replication of all update activity.

The sequence 400 includes operation 404, which comprises generating first server heartbeat information at the first server 102 at the local site 106. Operation 406 comprises storing the first server heartbeat information in (or on) the first primary site disk 138 at the local site 106. As an example, the first server heartbeat information may include a timestamp. More generally, the first server heartbeat information could include a number from a sequence of incrementing or decrementing numbers, and successive heartbeat information could include another number from the sequence. The first server heartbeat information may be generated by a PPRC Heartbeat Pumper thread, that periodically writes a unique timestamp to the first primary site disk 138, as long as the MSCS cluster service is up and running. Each server 102, 112 may write to its primary site disk with a cluster-wide unique value (ClusterId+SystemTime) for each write. A pumping frequency that is applicable to the entire cluster 100 may be given in the registry, which may be any configuration repository.

Operation 408 comprises sending (or attempting to copy) the first server heartbeat information from the first primary site disk 138, to the first secondary site disk 146 at the remote site 116. As an example, the sending operation 408 may include reading the first server heartbeat information from the first primary site disk 138 and attempting to transmit the first server heartbeat information over the communications link 150 to the first secondary site disk 146 at the remote site 116. If received at the first secondary site disk 146, the first server heartbeat information may be stored on the first secondary site disk 146. Unless a pertinent portion of the cluster 100 is nonoperational, the sending operation 408 will be successful, and the first server heartbeat information will be copied to the first secondary site disk 146.

As an example, PPRC may be used to perform the sending operation 408. However, methods other than PPRC could be used for performing peer to peer remote copy. With PPRC, the first storage controller 108 at the local site 106 may forward the first server heartbeat information to the second storage controller 118 at the remote site 116. Also, with PPRC, the second storage controller 118 may notify the first storage controller 108 that the second storage controller 118 has received the first server heartbeat information, and then the first storage controller 108 may notify the first server 102 that storage of the first server heartbeat information has been completed.

The sequence 400 also includes operation 410, which comprises receiving information from the second secondary site disk 140, which may comprise reading from the second secondary site disk 140. The sequence 400 also includes operation 412, which comprises determining if the information received from the second secondary site disk 140 includes updated heartbeat information (which may comprise determining if updated heartbeat information has been stored on the second secondary site disk 140). As an example, a separate thread or process in the first server 102 may monitor the heartbeat(s) received from the remote site 116, and a separate thread or process in the second server 112 may monitor the heartbeat(s) received from the local site 106. A thread that monitors a heartbeat may be called a PPRC Heartbeat Monitor. The Heartbeat Monitor may be part of a PPRC Heartbeat thread that also includes the PPRC Heartbeat Pumper, or may be a separate thread. As an example, the Heartbeat Monitor checks the heartbeat received from the peer site, and expects to see a different value each time it checks. Upon detecting a PPRC heartbeat miss, the Heartbeat Monitor may mark the peer site as being in the "NOTSURE" state. When the consecutive misses exceed a certain pre-defined threshold, the Heartbeat Monitor will announce that the peer is down. The receiving operation 410 and the determining operation 412 may be periodically repeated at a first frequency, and the generating 404, storing 406, and sending 408 operations may be periodically repeated at a second frequency, that in some embodiments may be at least as large as the first frequency. Thus, a polling technique is used to determine if the first server's 102 updated heartbeat information has been received at the remote site 116. In some examples, the operability of the PPRC links may be tested prior to generating heartbeat information, or prior to sending heartbeat information to another site, or prior to determining if updated heartbeat information has been stored.

Based on the receiving 410 and determining 412 operations, if it is determined that the information received from the second secondary site disk 140 includes updated heartbeat information, then the first server 102 can conclude that updated heartbeat information has been received from the second server 112, and can conclude, in operation 414, that the second server 112 is operational, and that the PPRC data replication is also operational. If in operation 412 it is determined that the information received from the second secondary site disk 140 does not include updated heartbeat information, then the sequence 400 may also include operation 416, which comprises determining if the PPRC state of the first primary site disk 138 is a suspended PPRC state. If it is determined that the PPRC state of the first primary site disk 138 is the suspended PPRC state, then the sequence 400 may also include operation 418, which comprises concluding that PPRC communications are not operational, or that the second storage system 114 is not operational. If it is determined that the PPRC state of the first primary site disk 138 is not the suspended PPRC state, then the sequence 400 may also include operation 420, which comprises concluding that the second server 112 at the remote site 116 is not operational.

A confirmation signal indicating that the first server heartbeat information was received at the remote site 116, may be transmitted from the remote site 116 to the local site 106. The sequence 400 may also include operation 422, which comprises detecting whether a confirmation signal is received at the local site 106 from the remote site 116. If the confirmation signal is received at the local site 106, then in operation 424 it may be concluded that the PPRC communications links 150, 152 are operational, and that the second storage system 114 is operational. If the confirmation signal is not received at the local site 106 from the remote site 116, the state of the first primary site disk 138 at the local site 106 will become suspended. Further, if the confirmation signal is not received at the local site 106 from the remote site 116, the sequence 400 may also include operation 426, which comprises determining whether communications between the first server 102 and the second server 112 are operational over any communications link other than the PPRC communications links 150 and 152. For example, operation 426 may comprise determining whether communications between the first server 102 and the second server 112 are operational over the private communications link 154, or the public communication link 164. A condition where both the private communications link 154 (the first level of arbitration) and the public communications link 164 (the second level of arbitration) are not operational may be called a total network communication fault. In situations where the PPRC communications links 150 and 152 are operational, if a total network communication fault exists, then the quorum disk arbiter (also called the failover service) may use the site disks to determine if servers at peer location are operational.

If in operation 426 it is determined that communications between the first server 102 and the second server 112 are operational over a communications link such as communications link 154 and/or public communication link 164, then the sequence 400 may also include operation 428, which comprises implementing a fault mode. The choice of which fault mode to implement may be user selectable in advance. An example of a fault mode that may be implemented is a failstop fault mode, which comprises taking PPRC resources offline and shutting down Microsoft Cluster Service (MSCS) at the local site 106 and the remote site 116. This option may be used in environments where data integrity and data consistency are most important. An example of an alternative fault mode that may be implemented is a failover fault mode, which comprises keeping a quorum owning server online, shutting down a peer server, and placing all resources under control of the quorum owning server. This option may be used in environments where data availability is most important. An example of another alternative fault mode that may be implemented is a No_New_Onlines fault mode, which comprises keeping a quorum owning server online and having resources stay online, shutting down cluster service at a peer server, and taking all of the peer server's resources offline. The No_New_Onlines fault mode may be the default option. An example of another alternative fault mode that may be implemented is an Online_No_Moves fault mode, which comprises keeping the first server 102 and the second server 112 online, and not taking any resources offline, and not allowing disk failover between the sites until the PPRC link is active and the disks are synchronized.

Referring to FIG. 4B, the sequence 400 may also include operation 434, which comprises generating second server heartbeat information at the second server 112 at the remote site 116, and may also include storing the second server heartbeat information in the second primary site disk 148 at the remote site 116, in operation 436. As an example, the second server heartbeat information may include a timestamp. The sequence 400 may also include operation 438, which comprises sending (which may comprise attempting to copy) the second server heartbeat information from the second primary site disk 148, to the second secondary site disk 140 at the local site 106. As an example, the sending operation 438 may include reading the second server heartbeat information from the second primary site disk 148 and attempting to transmit the second server heartbeat information over the communications link 152. Unless a pertinent portion of the cluster is nonoperational, the sending operation 438 will be successful, and the second server heartbeat information will be copied to the second secondary site disk 140. As an example, PPRC may be used to perform the copying operation 418. The sequence 400 may also include operation 440, which comprises receiving information from the first secondary site disk 146, which may comprise reading from the first secondary site disk 146. The sequence 400 may also include operation 442, which comprises determining if the information received from the first secondary site disk 146 includes updated heartbeat information (which may comprise determining if updated heartbeat information has been stored on the first secondary site disk 146). The receiving operation 440 and the determining operation 442 may be periodically repeated at a first frequency, and the generating 404, storing 406, and sending 408 operations (discussed above with reference to FIG. 4A) may be periodically repeated at a second frequency that may be at least as large as the first frequency.

Based on the receiving 440 and determining 442 operations, if it determined that the information received from the first secondary site disk 146 includes updated heartbeat information, then the second server 112 can conclude that updated heartbeat information has been received from the first server 102, and can conclude, in operation 444, that the first server 102 is operational, and that the PPRC data replication is also operational. If in operation 442 it is determined that the information received from first secondary site disk 146 does not include updated heartbeat information, then the sequence 400 may also include operation 446, which comprises determining if the PPRC state of the second primary site disk 148 is a suspended PPRC state. If it is determined that the PPRC state of the second primary site disk 148 is suspended, then in operation 448 it is concluded that PPRC communications are not operational, or that the first storage system 104 is not operational. If it is determined that the PPRC state of the second primary site disk 148 is not the suspended PPRC state, then the sequence 400 may also include operation 450, which comprises concluding that the first server 102 at the local site 106 is not operational.

A confirmation signal indicating that the second server heartbeat information was received at the local site 106, may be transmitted from the local site 106 to the remote site 116. The sequence 400 may also include operation 452, which comprises detecting whether a confirmation signal is received at the remote site 116 from the local site 106. If the confirmation signal is received at the remote site 116, then in operation 454 it may be concluded that the PPRC communications links 150, 152 are operational, and that the first storage system 104 is operational. If the confirmation signal is not received at the remote site 116 from the local site 106, the state of the second primary site disk 148 at the remote site 116 will become suspended. Further, if the confirmation signal is not received at the remote site 116 from the local site 106, the sequence 400 may also include operation 456, which comprises determining whether communications between the first server 102 and the second server 112 are operational over any communications link other than the PPRC communications links 150 and 152. For example, operation 456 may comprise determining whether communications between the first server 102 and the second server 112 are operational over the private communications link 154, or the public communication link 164.

If in operation 456 it is determined that communications between the first server 102 and the second server 112 are operational over a communications link such as the private communications link 154 and/or public communication link 164, then the sequence 400 may also include operation 458, which comprises implementing a fault mode, as discussed above.

In a first example, each server 102, 121 at the local site 106 may generate heartbeat information, which may be stored on the first primary site disk 138 (or on more than one site disk), and copied from the first primary site disk 138 to the first secondary site disk 146. In a second example, if there is more than one server at the local site 106, whichever server is in control of the cluster at the local site 106 could generate heartbeat information for the local site 106, which in this second example, would be the only heartbeat information from the local site 106. In the second example, if the first server 102 becomes nonoperational, the third server 121 could generate heartbeat information for the local site 106.

FIG. 4C shows operations for an example of the invention in which the third server 121 (shown in FIG. 1) is included at the local site 106, and in which the third server 121 generates third server heartbeat information. As shown in FIG. 4C, the sequence 400 may include operation 464, which comprises generating third server heartbeat information at the third server 121 at the local site 106, and operation 466, which comprises storing the third server heartbeat information in the first primary site disk 138 at the local site 106. The sequence 400 may also include sending the third server heartbeat information from the first primary site disk 138 to the first secondary site disk 146 at the remote site 116, in operation 468. The sequence 400 also includes operation 470, which comprises receiving information from the second secondary site disk 140, which may comprise reading from the second secondary site disk 140. The sequence 400 also includes operation 472, which comprises determining if the information received from the second secondary site disk 140 includes updated heartbeat information (which may comprise determining if updated heartbeat information has been stored on the second secondary site disk 140). The receiving operation 470 and the determining operation 472 may be periodically repeated at a first frequency, and the generating 464, storing 466, and attempting to copy 468 operations may be periodically repeated at a second frequency that in some embodiments may be at least as large as the first frequency.

Based on the receiving 470 and determining 472 operations, if it is determined that the information received from the second secondary site disk 140 includes updated heartbeat information, then the third server 121 can conclude that updated heartbeat information has been received from the second server 112, and can conclude, in operation 474, that the second server 112 is operational, and that the PPRC data replication is also operational. If in operation 472 it is determined that the information received from the second secondary site disk 140 does not include updated heartbeat information, then the sequence 400 may also include operation 476, which comprises determining if the PPRC state of the first primary site disk 138 is a suspended PPRC state. If it is determined that the PPRC state of the first primary site disk 138 is the suspended PPRC state, then the sequence 400 may also include operation 478, which comprises concluding that PPRC communications are not operational, or that the second storage system 114 is not operational. If it is determined that the PPRC state of the first primary site disk 138 is not the suspended PPRC state, then the sequence 400 may also include operation 480, which comprises concluding that the second server 112 at the remote site 116 is not operational.

A confirmation signal indicating that the third server heartbeat information was received at the remote site 116, may be transmitted from the remote site 116 to the local site 106. The sequence 400 may also include operation 482, which comprises detecting whether a confirmation signal is received at the local site 106 from the remote site 116. If the confirmation signal is received at the local site 106, then in operation 484 it may be concluded that the PPRC communications links 150, 152 are operational, and that the second storage system 114 is operational. If the confirmation signal is not received at the local site 106 from the remote site 116, the state of the first primary site disk 138 at the local site 106 will become suspended. Further, if the confirmation signal is not received at the local site 106 from the remote site 116, the sequence 400 may also include operation 486, which comprises determining whether communications between the third server 121 and the second server 112 are operational over any communications link other than the PPRC communications links 150 and 152. For example, operation 486 may comprise determining whether communications between the third server 121 and the second server 112 are operational over the private communications link 154, or the public communication link 164.

If in operation 486 it is determined that communications between the third server 121 and the second server 112 are operational over a communications link such as communications link 154 and/or public communication link 164, then the sequence 400 may also include operation 488, which comprises implementing a fault mode, as discussed above.

When a server fails, the server that owns the quorum resource may bring the resources owned by the faulted server online on the next server in each failover group's preferred owner list. In the case where the server that owns the quorum resource fails, the remaining servers may arbitrate for the quorum resource, and then bring the resources from the failed server online on the next server in each failover group's preferred owner list. Each failover group has a priority based ordered list of servers that are capable of bringing all resources in the failover group online. In the case of a failover, the next highest server in the list is chosen to bring the failover group online.

The site disk PPRC pairs use the PPRC feature Read From Secondary (RFS), which provides read only access, to allow a server that has access to one of the secondary site disks 140, 146 to read the heartbeat information on disk that is being updated by a server (or servers) at the other site. If the heartbeat information is being updated, then the server(s) at the other site that are updating the heartbeat information are known to be operational (and it is also known that PPRC is active and that the storage subsystem at the other site is operational). If the heartbeat information is not being updated then one of two situations has occurred: (1) the link, or the storage (sub)system at the other site are down, or, (2) the server(s) at the other site are not operational. To determine which situation has occurred, the PPRC state of the primary site disk is checked at the site that is not receiving updated heartbeat information. PPRC states can be (1) active (duplexed), which is in the normal operational state, (2) suspended, because there is either a communication fault or a problem with the target storage subsystem, or (3) not active, because a PPRC pair has been terminated.

If the PPRC state of a primary site disk is suspended, the suspended condition is the result of either the PPRC link being down or the storage system at the other site being down. If a storage system is down, IsAlive will fail on all servers at the site of the failed storage system. The IsAlive function is used for a thorough resource status evaluation and is regularly polled by the Resource Monitor. If the PPRC state of a primary site disk 140, 146 is not suspended, then it can be concluded that the PPRC link is operational (active), and that the storage system at the other site is operational. Additionally, if the PPRC state of a primary site disk at a site is not suspended, but updated heartbeat information is not being received from another site, then it can be concluded that the server(s) are not operational at the site from which the heartbeat signals are not being received. A "clean ending status" is achieved if after heartbeat information is written from a server to a primary site disk and is copied to a secondary site disk at another site, a confirming signal is received at the site of the primary site disk from the site of the secondary site disk. The confirming signal indicates that the heartbeat information was received at the secondary site disk.

The invention facilitates transferring the state (active or not active) of a first server connected to a (PPRC) primary site disk (or volume) at one site, to a corresponding secondary site disk (or volume) at another site. The site disks typically are used for management purposes only, and are not used as data disks. A second server at the site of the (PPRC) secondary volume can then access the state of the server located at the site of the primary site disk by reading the state information from the (PPRC) secondary volume. This is possible because the PPRC pair is established using the Read From Secondary option. A different PPRC pair established in the opposite direction permits transferring the second server's state to the first server. Alternatively, bidirectional communication link (s) could be used. In one alternative example, a bidirectional communication link could be used, and server heartbeats could be stored on different areas of a single site disk at each site. Irrespective of whether unidirectional or bidirectional communication links are used, this technique permits a server at a site in a geographically dispersed cluster that is using outboard mirroring (such as PPRC), to determine the state of the servers at a different site, even when other cluster heartbeat communication link(s), such as the private communications link 154 and the public communications link 164, are not operational. Thus, in situations where a common resource such as a quorum disk or arbitration server cannot be used as the third level of arbitration for ownership of the cluster, for example in a geographically dispersed cluster, the method of the invention can be used to provide the third level of arbitration. The first level of arbitration is provided by a private communication link such as link 154, and the second level of arbitration is provided by a public communications link such as link 164. The invention provides the third level of arbitration by using PPRC communications to allow server(s) to determine if server(s) at another site in a cluster are still operational. In other words, the invention utilizes PPRC to provide a common resource that can be used as a third level of arbitration instead of a quorum disk or arbitration server. Thus, use of the invention can beneficially prevent the split brain syndrome for both majority-node-set clusters and shared-quorum clusters in geographically dispersed configurations.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A computer readable storage medium having a program of machine readable instructions executed to perform operations, wherein a first server at a local site is in communication with a first primary site disk and second secondary site disk at the local site and a first secondary site disk and a second primary site disk at a remote site, wherein the program is executed to perform remotely monitoring activity by performing operations, the operations comprising:

generating first server heartbeat information at the first server at the local site;

storing the first server heartbeat information on the first primary site disk at the local site;

periodically repeating at a second frequency, the operation of sending the first server heartbeat information from the first primary site disk, to the first secondary site disk at the remote site;

periodically repeating at a first frequency, wherein the second frequency is larger than the first frequency, the operation of receiving at the first server information from the second secondary site disk at the local site;

determining if the information received from the second secondary site disk includes updated heartbeat information, and if so, transmitting a confirming signal from the local site to the remote site, wherein the confirming signal transmitted from the local site indicates that the local site received the updated heartbeat information from the remote site; and determining if the information received from the second secondary site disk at the local site does not include updated heartbeat information for a pre-defined threshold consecutive number of repetitions of the operation of receiving information from the second secondary site disk at the local site.

2. The computer readable medium of claim 1, wherein a second server is at the remote site, wherein the operations further comprise:

detecting whether the confirming signal is received at the remote site;

generating second server heartbeat information at the second server at the remote site;

storing the second server heartbeat information on the second primary site disk at the remote site;

sending the second server heartbeat information from the second primary site disk, to a second secondary site disk at the local site;

receiving information from the first secondary site disk at the remote site;

determining if the information received from the first secondary site disk includes updated heartbeat information, and if so, transmitting a confirming signal from the remote site to the local site, wherein the confirming signal transmitted from the remote site indicates that the remote site received the updated heartbeat information from the local site; and determining if the information received from the first secondary site disk does not include updated heartbeat information for a pre-defined threshold consecutive number of repetitions of the operation of receiving information from the first secondary site disk at the remote site.

3. The computer readable medium of claim 2, wherein the operations further comprise:

establishing first and second PPRC pairs using a Read From Secondary option, wherein the first PPRC pair comprises the first primary site disk and the first secondary site disk, and the second PPRC pair comprises the second primary site disk and the second secondary site disk.

4. The computer readable medium of claim 1, wherein the operations further comprise:

establishing a PPRC pair using a Read From Secondary option, wherein the PPRC pair comprises the first primary site disk and the first secondary site disk.

5. The computer readable medium of claim 1, wherein PPRC is used to perform the sending operation.

6. The computer readable medium of claim 1, wherein the sending operation comprises:

receiving the first server heartbeat information from the first primary site disk; and attempting to transmit the first server heartbeat information over a communications link to the remote site.

7. The computer readable medium of claim 1, wherein the first server heartbeat information comprises a timestamp.

8. The computer readable medium of claim 1, wherein a third server is at the local site, wherein the operations further comprise:

generating third server heartbeat information at the third server at the local site;

storing the third server heartbeat information in the first primary site disk at the local site; and sending the third server heartbeat information from the first primary site disk, to the first secondary site disk at the remote site.

9. A computer readable storage medium having a program of machine readable instructions executed to perform operations, wherein a first server at a local site is in communication with a first primary site disk and second secondary site disk at the local site and a second server, first secondary site disk and a second primary site disk at a remote site, wherein the program is executed to perform remotely monitoring activity by performing operations, the operations comprising:

generating first server heartbeat information at the first server at the local site;

storing the first server heartbeat information on the first primary site disk at the local site;

periodically repeating at a second frequency, the operation of sending the first server heartbeat information from the first primary site disk, to the first secondary site disk at the remote site;

periodically repeating at a first frequency, wherein the second frequency is larger than the first frequency, the operation of receiving at the first server information from the second secondary site disk at the local site;

determining if the information received from the second secondary site disk includes updated heartbeat information, and if so, transmitting a confirming signal from the local site to the remote site, wherein the confirming signal transmitted from the local site indicates that the local site received the updated heartbeat information from the remote site;

determining if the information received from the second secondary site disk at the local site does not include updated heartbeat information for a pre-defined threshold consecutive number of repetitions of the operation of receiving information from the second secondary site disk at the local site;

detecting whether the confirming signal is received at the remote site;

generating second server heartbeat information at the second server at the remote site;

storing the second server heartbeat information on a second primary site disk at the remote site;

sending the second server heartbeat information from the second primary site disk, to a second secondary site disk at the local site;

receiving information from the first secondary site disk at the remote site;

determining if the information received from the first secondary site disk includes updated heartbeat information, and if so, transmitting a confirming signal from the remote site to the local site, wherein the confirming signal transmitted from the remote site indicates that the remote site received the updated heartbeat information from the local site; and determining if the information received from the first secondary site disk does not include updated heartbeat information for a pre-defined threshold consecutive number of repetitions of the operation of receiving information from the first secondary site disk at the remote site.

10. The computer readable medium of claim 9, wherein PPRC is used to perform the sending operations.

11. A computing system, comprising:
a first storage system located at a local site, wherein the first storage system has a first primary site disk and a second secondary site disk;
a second storage system located at a remote site and coupled to the first storage system, wherein the second storage system includes a first secondary site disk;
a first server located at the local site and coupled to the first storage system, wherein the first server is programmed to perform operations for remotely monitoring activity, the operations comprising:
generating first server heartbeat information at the first server at the local site;
storing the first server heartbeat information on the first primary site disk at the local site;
periodically repeating at a second frequency, the operation of sending the first server heartbeat information from the first primary site disk, to the first secondary site disk at the remote site;
periodically repeating at a first frequency, wherein the second frequency is larger than the first frequency, the operation of receiving at the first server information from the second secondary site disk at the local site;
determining if the information received from the second secondary site disk includes updated heartbeat information, and if so, transmitting a confirming signal from the local site to the remote site, wherein the confirming signal transmitted from the local site indicates that the local site received the updated heartbeat information from the remote site; and
determining if the information received from the second secondary site disk at the local site does not include updated heartbeat information for a pre-defined threshold consecutive number of repetitions of the operation of receiving information from the second secondary site disk at the local site.

12. The system of claim 11, wherein the second storage further has a second primary site disk, further comprising:
a second server located at the remote site and coupled to the second storage system, wherein the second server is programmed to perform operations for remotely monitoring activity, the operations comprising:
detecting whether the confirming signal is received at the remote site;
generating second server heartbeat information at the second server at the remote site;
storing the second server heartbeat information on the second primary site disk at the remote site;
sending the second server heartbeat information from the second primary site disk, to a second secondary site disk at the local site;
receiving information from the first secondary site disk at the remote site;
determining if the information received from the first secondary site disk includes updated heartbeat information, and if so, transmitting a confirming signal from the remote site to the local site, wherein the confirming signal transmitted from the remote site indicates that the remote site received the updated heartbeat information from the local site; and
determining if the information received from the first secondary site disk does not include updated heartbeat information for a pre-defined threshold consecutive number of repetitions of the operation of receiving information from the first secondary site disk at the remote site.

13. The system of claim 12, wherein the operations further comprise:
establishing first and second PPRC pairs using a Read From Secondary option, wherein the first PPRC pair comprises the first primary site disk and the first secondary site disk, and the second PPRC pair comprises the second primary site disk and the second secondary site disk.

14. The system of claim 11, wherein the operations further comprise:
establishing a PPRC pair using a Read From Secondary option, wherein the PPRC pair comprises the first primary site disk and the first secondary site disk.

15. The system of claim 11, wherein PPRC is used to perform the sending operation.

16. The system of claim 11, wherein the sending operation comprises:
receiving the first server heartbeat information from the first primary site disk; and
attempting to transmit the first server heartbeat information over a communications link to the remote site.

17. The system of claim 11, wherein the first server heartbeat information comprises a timestamp.

18. The system of claim 11, further comprising:
a third server located at the local site and coupled to the first storage system, wherein the third server is programmed to perform operations for remotely monitoring activity, the operations comprising:
generating third server heartbeat information at the third server at the local site;
storing the third server heartbeat information in the first primary site disk at the local site; and
sending the third server heartbeat information from the first primary site disk, to the first secondary site disk at the remote site.

19. A computing system, comprising:
a first storage system located at a local site, wherein the first storage system has a first primary site disk and a second secondary site disk;
a second storage system located at a remote site and coupled to the first storage system, wherein the second storage system includes a first secondary site disk and a second primary site disk;
a first server located at the local site and coupled to the first storage system, wherein the first server is programmed to perform operations for remotely monitoring activity, the operations comprising:
generating first server heartbeat information at the first server at the local site;
storing the first server heartbeat information on the first primary site disk at the local site;
periodically repeating at a second frequency, the operation of sending the first server heartbeat information from the first primary site disk, to the first secondary site disk at the remote site;
periodically repeating at a first frequency, wherein the second frequency is larger than the first frequency, the operation of receiving at the first server information from the second secondary site disk at the local site;
determining if the information received from the second secondary site disk includes updated heartbeat information, and if so, transmitting a confirming signal from the local site to the remote site, wherein the confirming signal transmitted from the local site indicates that the local site received the updated heartbeat information from the remote site;

determining if the information received from the second secondary site disk at the local site does not include updated heartbeat information for a pre-defined threshold consecutive number of repetitions of the operation of receiving information from the second secondary site disk at the local site;

a second server located at the remote site and coupled to the second storage system, wherein the second server is programmed to perform operations for remotely monitoring activity, the operations comprising:

detecting whether the confirming signal is received at the remote site;

generating second server heartbeat information at the second server at the remote site;

storing the second server heartbeat information on a second primary site disk at the remote site;

sending the second server heartbeat information from the second primary site disk, to a second secondary site disk at the local site;

receiving information from the first secondary site disk at the remote site;

determining if the information received from the first secondary site disk includes updated heartbeat information, and if so, transmitting a confirming signal from the remote site to the local site, wherein the confirming signal transmitted from the remote site indicates that the remote site received the updated heartbeat information from the local site; and determining if the information received from the first secondary site disk does not include updated heartbeat information for a pre-defined threshold consecutive number of repetitions of the operation of receiving information from the first secondary site disk at the remote site.

20. The system of claim 19, wherein PPRC is used to perform the sending operations.

\* \* \* \* \*